United States Patent
Swartz et al.

(10) Patent No.: US 6,478,225 B1
(45) Date of Patent: Nov. 12, 2002

(54) ADAPTIVE BAR CODE SCANNER

(75) Inventors: Jerome Swartz, Old Field; Edward Barkan, Miller Place; Glenn S. Spitz, Far Rockaway; Joseph Katz; Boris Metlitsky, both of Stony Brook, all of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/637,831

(22) Filed: Aug. 11, 2000

Related U.S. Application Data (63) Continuation of application No. 08/317,775, filed on Oct. 4, 1994, now abandoned, which is a continuation of application No. 07/897,835, filed on Jun. 12, 1992, now abandoned, which is a continuation-in-part of application No. 07/506,674, filed on Apr. 9, 1990, now abandoned, which is a continuation of application No. 07/260,692, filed on Oct. 21, 1988, now Pat. No. 4,933,538, said application No. 09/637,831, is a continuation-in-part of application No. 07/553,559, filed on Jul. 16, 1990, now abandoned, and a continuation-in-part of application No. 07/562,130, filed on Aug. 3, 1990, now Pat. No. 5,151,580.

(51) Int. Cl.[7] .......................... G02B 26/08; G06K 7/10
(52) U.S. Cl. ............................. 235/462.22; 235/462.25
(58) Field of Search .......................... 235/455, 462.06, 235/462.22, 462.25

(56) References Cited

U.S. PATENT DOCUMENTS

| | | | |
|---|---|---|---|
| 4,251,798 A | | 2/1981 | Swartz et al. |
| 4,360,798 A | | 11/1982 | Swartz et al. |
| 4,369,361 A | | 1/1983 | Swartz et al. |
| 4,387,297 A | | 6/1983 | Swartz et al. |
| 4,408,231 A | * | 10/1983 | Bushaw et al. ............. 358/280 |
| 4,409,470 A | | 10/1983 | Shepard et al. |
| 4,760,248 A | | 7/1988 | Swartz et al. |
| 4,792,666 A | | 12/1988 | Cherry et al. |
| 4,794,239 A | | 12/1988 | Allais |
| 4,800,256 A | | 1/1989 | Brookman et al. |
| 4,808,804 A | | 2/1989 | Krichever et al. |
| 4,882,476 A | | 11/1989 | White |
| 4,896,026 A | | 1/1990 | Krichever et al. |
| 4,933,538 A | | 6/1990 | Heiman et al. |
| 5,121,154 A | * | 6/1992 | Yamada et al. ............. 354/403 |
| 5,200,597 A | | 4/1993 | Eastman et al. |
| 5,260,554 A | | 11/1993 | Grodevant |
| 5,528,022 A | * | 6/1996 | Nakazawa ............... 235/455 X |
| 6,233,098 B1 | * | 5/2001 | Plesko ......................... 359/666 |

FOREIGN PATENT DOCUMENTS

| | | | |
|---|---|---|---|
| EP | 0460669 | * | 11/1991 |
| EP | 0498366 A2 | | 8/1992 |

OTHER PUBLICATIONS

Barkan et al., "Depth of modulation and spot size selection in bar–code laser scanners," Advances in Laser Scanning Technology, SPIE, vol. 299, Aug. 27–28, 1981, pp. 82–97.
Barkan et al., "System design considerations in bar–code laser scanning," Optical Engineering, vol. 23, No. 4, Jul./Aug. 1984, pp. 413–420.

* cited by examiner

Primary Examiner—Karl D. Frech
(74) Attorney, Agent, or Firm—Kirschstein, et al.

(57) ABSTRACT

An adaptive system and a method for reading bar code symbols or the like, including a scanner for generating a light beam directed toward a target, the light beam sweeping the symbol to be read. The system further includes a photodetector for receiving reflected light from such symbol, and circuitry to determine whether the signal received is sufficiently distinct to determine that a valid symbol has been scanned, and signal processing circuitry having adjustable gain, bandwidth, and digitizer threshold characteristics for processing such signals.

27 Claims, 7 Drawing Sheets

ADAPTIVE BAR CODE SCANNER

REFERENCE TO RELATED APPLICATIONS

This is a continuation of application Ser. No. 08/317,775, filed Oct. 4, 1994, now abandoned, which is a continuation of application Ser. No. 07/897,835, filed Jun. 12, 1992, now abandoned, all of which are incorporated herein by reference.

This application is also a continuation-in-part of U.S. patent application Ser. No. 07/506,674, filed Apr. 9, 1990, now abandoned, which in turn is a continuation of Ser. No. 07/260,692, filed Oct. 21, 1988, now U.S. Pat. No. 4,933,538. This application is also a continuation-in-part of U.S. patent application Ser. No. 07/562,130, filed Aug. 3, 1990, now U.S. Pat. No. 5,151,580, and U.S. patent application Ser. No. 07/553,559, filed Jul. 16, 1990, now abandoned. This application is further related to U.S. patent application Ser. No. 07/790,627, abandoned, filed Nov. 12, 1991, which is a divisional of said Ser. No. 07/562,130, U.S. Pat. No. 5,151,580 and Ser. No. 07/635,431 filed Dec. 28, 1990, U.S. Pat. No. 5,168,148 all of said applications being assigned to Symbol Technologies, Inc.

BACKGROUND OF THE INVENTION

1. Field of the Invention

This invention generally relates to scanners operative for electro-optically reading indicia having parts of different light reflectivity, for example, bar code symbols, and, more particularly, to control circuitry in such scanners to enable the scanner to adapt to specific application environments and symbol readability conditions. The invention also relates to an optical design for eliminating collection optical components in the return path along which light reflected off the indicia travels.

2. Description of the Related Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article of some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, a light beam, at a target and a symbol to be read.

The light source in a laser scanner bar code reader is typically a gas laser or semiconductor laser. The use of semiconductor devices as the light source in scanning systems is especially desirable because of their small size, low cost and low power requirements. The laser beam is optically modified, typically by a focusing optical assembly, to form a beam spot of a certain size at the target distance. It is preferred that the cross section of the beam spot at the target distance be approximately the same as the minimum width between regions of different light reflectivity, i.e., the bars and spaces of the symbol.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For the purpose of our discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference. Another structure, known as "PDF 417", is described in U.S. patent application Ser. No. 461,881.

In the scanning systems known in the art, the light beam is directed by a lens or similar optical components along a light path toward a target that includes a bar code symbol on the surface. The scanner operates by repetitively scanning the light beam in a line or series of lines across the symbol by means of motion of a scanning component, such as a mirror, disposed in the path of the light beam. The scanning component may either sweep the beam spot across the symbol and trace a scan line across and past the symbol, or scan the field of view of the scanner, or do both.

Bar code reading systems also include a sensor or photodetector which functions to detect light reflected or scattered from the symbol. The photodetector or sensor is positioned in the scanner in an optical path so that it has a field of view which extends across and slightly past the symbol. A portion of the light which is reflected or scattered off the symbol is detected and converted into an electrical signal. Electronic circuitry or software decodes the electrical signal into a digital representation of the data represented by the symbol that has been scanned. For example, the analog electrical signal operated by the photodetector may be converted into a pulse width modulated digital signal, with the widths corresponding to the physical widths of the bars and spaces. Such a digitized signal is then decoded based upon the specific symbology used by the symbol into a binary representation of the data encoded in the symbol, and subsequently to the alphanumeric characters so represented.

The decoding process is known bar code reading systems usually works in the following way. The decoder receives the pulse width modulated digital signal from the bar code reader, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

It must be recognized that the overall performance of a scanning system for reading symbols is a function not only of the optical, but also of the electronic sub-system. A measure of the overall performance of a bar code reader is the ability to resolve narrowest elements and to decode symbols located perhaps hundreds of inches away from the reader. The optical subsystem will focus the beam to have a certain measurable spot size, but the electronic sub-system, and particularly the analog signal processing circuitry, also has a role to play in contributing to the detection and spot size. One method of measuring the contribution of the circuitry is by the concept of effective spot size which was introduced by Eric Barkan and Jerome Swartz in the following two articles:

1. "Advances in Laser Scanning Technology", Proceedings of The International Society For Optical Engineering, Volume 299, Aug. 27–28, 1981.
2. "System Design Considerations in Bar-Code Laser Scanning", Optical Engineering, Volume 23, No. 4, Pages 413–420, July/August, 1981

The concept of effective spot size was defined in such articles by the following equation:

$$\text{wherein: wherein: } W_{eff}(2) = \sqrt{W_{opt}^2(2) + W_{el}^2(2)}$$

$W_{opt}$ is the spot size of the focused beam at the focal plane due solely to the optical system; and $W_{el}$ is the addition to the spot size caused by the electrical system The $W_{el}$ parameter is a function of the frequency bandwidth or the time constant of the analog system processing circuitry, as well as a function of the laser beam spot velocity at the focal or scanning plane. With increasing distance from the housing, the contribution of $W_{el}$, results in an increase in the value of $W_{eff}$, thereby degrading overall system performance at such far-out distances. At too long a far-out distance, the symbol can no longer be read.

Prior to the present invention, the adjustment of scanning parameters was made on a piecemeal basis, by independently adjusting a single parameter like beam intensity or amplifier gain. No consideration was given to the simultaneously adjusting several different optical and electrical parameters together so that the readability of a symbol at a given distance or range of distances or a particular application or operational object (e.g., maximum working range) is optimized.

SUMMARY OF INVENTION

Briefly, and in general terms, the invention provides an adaptive system and a method for reading bar code symbols or the like, including a scanner for generating a light beam having adjustable characteristics directed toward a target that sweeps an entire symbol to be read. The system further includes a photodetector for receiving reflected light from such symbol and circuitry to determine whether the signal received is sufficiently distinct to determine that a valid symbol has been scanned, and signal processing circuitry having adjustable characteristics for processing such signals.

More particularly, the invention provides a method of operating a bar code scanner, comprising the steps of directing a light beam at a bar code symbol; detecting light reflected from said bar code symbol and generating an electrical signal in response thereto; and processing the electrical signal in a circuit having a selectable gain, bandwidth and digitizer thresholds. The readability of the bar code symbol as represented by the electrical signal is then determined to produce a control signal; and the gain and/or bandwidth and/or digitizer threshold of the signal processing circuits are changed in response to the control signal, or other adjustments to scanner operation are made, such as the location of the "waist" of the laser beam.

The novel features characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF THE PREFERRED EMBODIMENT

As used in this specification and the following claims, the term "symbol" and "bar code" is intended to be broadly construed and to cover not only patterns composed of alternating bars and spaces of various widths, but also other one or two dimensional graphic patterns, as well as alphanumeric characters.

The invention generally relates to a scanner systems utilizing a light source for reflecting light off indicia of different light reflectivity such as bar code symbols. More particularly, the invention provides a scanner system in which adjustment of various optical parameters of the scanning beam and/or electrical parameters of the light detecting and processing circuitry is automatically made to effect appropriate detection, sweeping and/or scanning of symbols to be read. The invention further provides a method for operating a scanner system by providing signals to the current drive of the light source and the scanning motor controller in response to detection of indicia which represents or may represent a portion of a desired target, such as a bar code symbol.

The present invention also relates to scanning systems incorporating techniques for automatically initiating and terminating scanning of the target. One feature of some scanner systems is the use of a manually operated trigger to initiate scanning of the target, such as described in U.S. Pat. No. 4,387,297. Although for many applications the use of a trigger is an important feature, there are some applications in which it may be desirable to use alternate activation techniques to initiating scanning, and such techniques are described herein and also within the scope of the present invention.

U.S. Pat. No. 4,933,538, assigned to the assignee of this application, describes a bar code reader including a processor which determines whether the reflected light represents a spatial variation that could represent a bar code and generates an enabling signal in response to such determination. A controller is provided for modifying the light beam in response to the enabling signal by changing the intensity, spot size, scanning path, and/or rate of scanning of the light beam.

U.S. Pat. No. 4,808,804, also assigned to the assignee of this application, describes a bar code reading system in which the working distance or beam spot size may be changed.

The present invention extends the technique of processing and analysis of the reflected light as originally set forth in the aforesaid U.S. Pat. No. 4,933,538. The present invention also extends the technique of controlling the bar code reader by not only modifying the light beam, if necessary, such as described therein or in U.S. Pat. No. 4,808,804 but also adjusting electrical parameters in the detection and signal processing portion of the bar code reader.

U.S. patent application Ser. No. 553,559, filed Jul. 16, 1990 and assigned to the assignee of this application, describes a bar code reader in which a microprocessor is utilized to control motor scan speed, laser power, gain of analog amplifier, and digitizing thresholds to help decode difficult-to-read symbols. Proper settings determined during manufacturing can be stored in non-volatile memory.

The present invention elaborates on the technique of utilizing the microprocessor as originally set forth in the aforesaid U.S. patent application Ser. No. 553,559.

U.S. patent application Ser. No. 562,130, filed Aug. 3, 1990 and assigned to the assignee of this application, describes a bar code reader in which characteristics of bar code symbols being read are detected and processed to determine whether the symbols are high-density or low-density bar code symbols. The signal processing circuitry of the reader is altered in bandwidth in response to the results of such determination. In this manner, the bandwidth best suited for reading the type of bar code being detected is utilized by the signal processing circuitry. A wide bandwidth will allow more noise to propagate through the processing circuitry, and so the bandwidth is narrowed to use only that which is needed. Low density bar codes do not require as much bandwidth in the signal processing circuitry as high-density bar codes. The present invention extends the technique described in the aforesaid U.S. patent application as well.

In a barcode scanner, it is common for various operational parameters to be defined in software to adapt the scanner for use in specific applications. For example, the data rate of information transfer, or other interface parameters, as well as the types of symbologies to be decoded, are frequently determined by the user or by the scanner manufacturer and the specific scanner model configured for the applications environment in which it is to operate.

Sometimes it is also desirable to adjust or modify the electrical parameters or functions of certain scanner hardware to better enable the scanner to perform in reading symbols associated with a particular application. For example, a scanner that is to be used to read dot matrix printed symbols on a high speed conveyor need to have certain parameters set in a particular way compared to a scanner used to read stationary high density symbols.

To optimize the performance of a bar code scanner, such parameters as motor speed, amplifier gain, laser power amplifier bandwidth and digitizer thresholds are commonly adjusted and set at the time of manufacture or upon installation of the scanner. Such adjustment has typically been performed by installing particular component values on the circuit board or by adjusting trimpots. A skilled technician or engineer is needed to properly determine how these adjustments are to be made.

The present invention provides adjustable circuitry in a bar code scanner such that all the types of adjustments mentioned above, and perhaps others, can be made under the control of a microprocessor. The same microprocessor used to decode symbols and/or interface with external equipment can be used for such adjustment operations. Such adjustments may be made during the manufacturing process for producing different models of bar code readers having predetermined or preset operating characteristics for dedicated use by the customer. Such adjustments may also be implemented by the customer at the time of installation, or at the beginning of a particular job. Such adjustments can also be made by the scanner automatically when placed in a "self-adjusting" mode, so that the scanner automatically adjusts to the symbol being presented to it.

Microprocessors can make these adjustments of optical and electrical parameters in various ways depending upon the accuracy and resolution needed. Examples of circuits that can be implemented in order to enable the microprocessor to make these adjustments are digital to analog convertors, digital potentiometers, analog switches, FETs and transistors.

Another application of the present invention are those applications in which optimized parameters for different target ranges are stored in memory and then automatically called up by the processor when a symbol at a particular target range is presented to the scanner. Examples of such applications include the reading of bar codes on packages on a conveyer belt, in which the bar code label on the packages are situated at a number of different distances from the scanner.

The present invention also provides a method and apparatus for operating a bar code reading system in which two different types of bar codes may be read—a standard linear bar code, and a two-dimensional bar code. The present invention also provides a technique for adjusting the spatial coverage or vertical sweep of the scanning beam, the detector electronics, and the appropriate decoder software in order to accurately read a two dimensional bar code.

Figure 1:
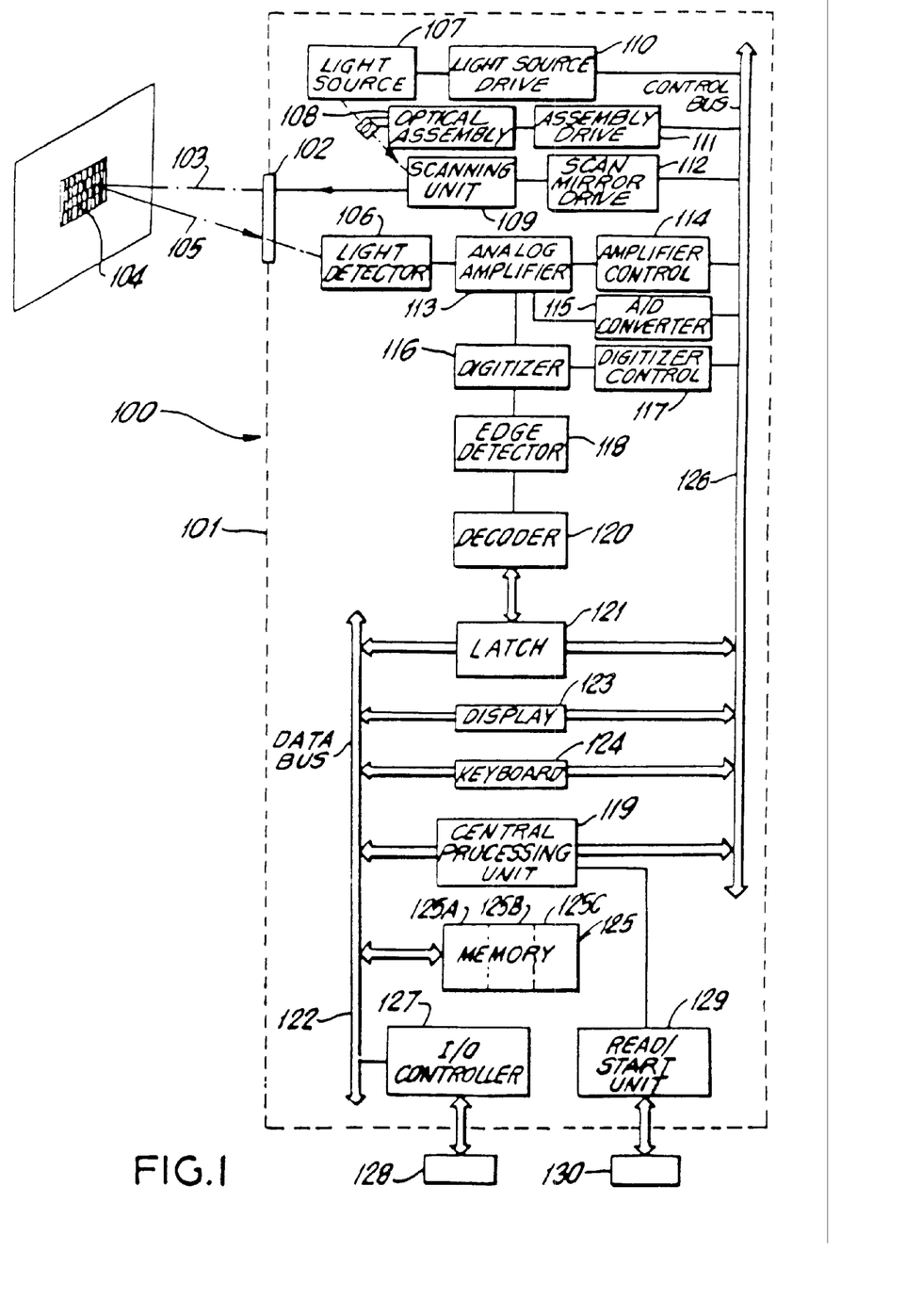
FIG. 1 is a highly simplified block diagrammatic representation of a scanning system for reading bar codes.

Referring to FIG. 1, there is shown a highly simplified block diagram representation of an embodiment of one type of bar code reader that may be designed according to the principles of the present invention. The reader 100 may be implemented in a portable scanner, or as a desk-top workstation or stationery scanner. In the preferred embodiment, the reader is implemented in a lightweight plastic housing 101.

Figure 2:
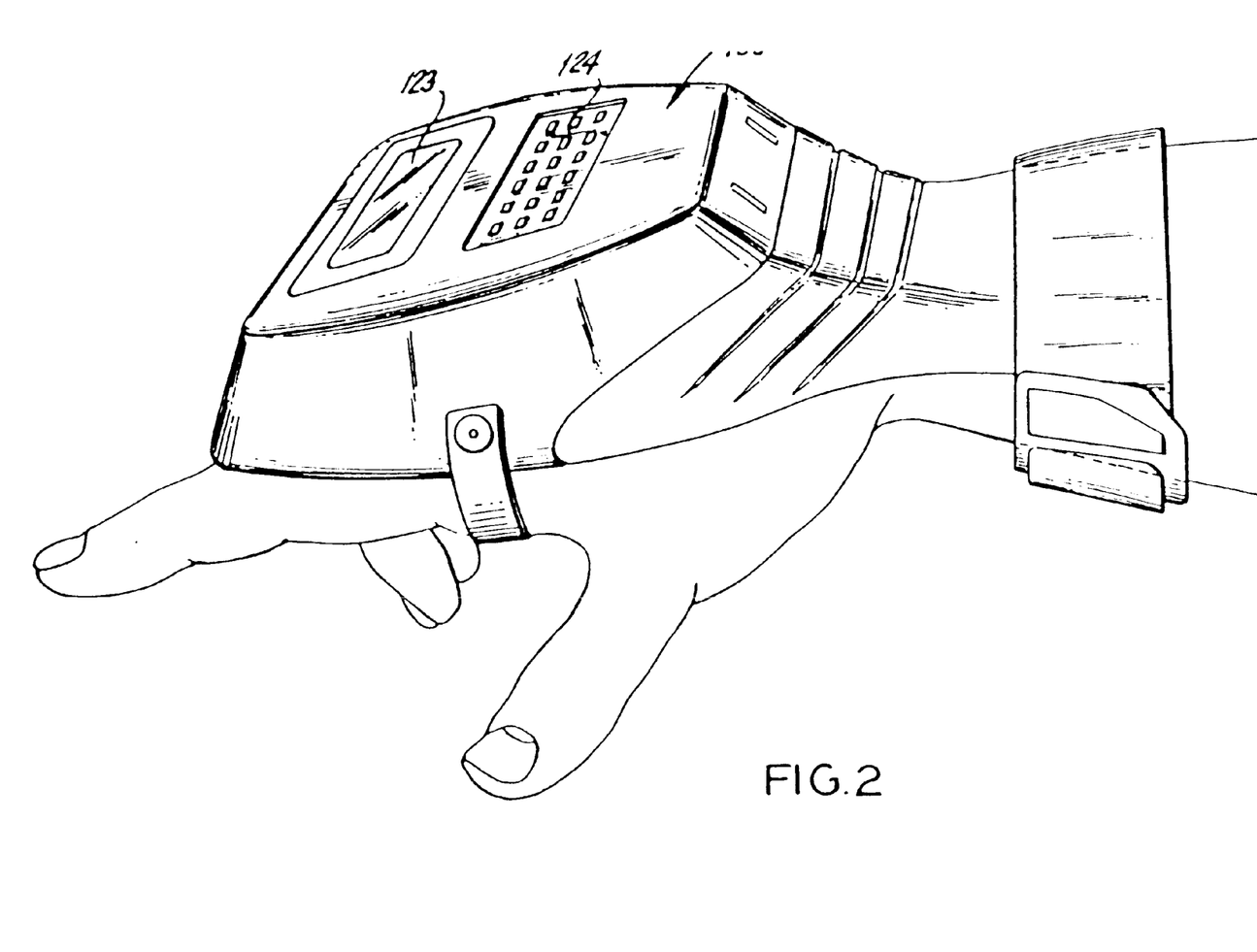
FIG. 2 is a perspective view of one embodiment of a bar code reader according to the present invention.
Figure 3:
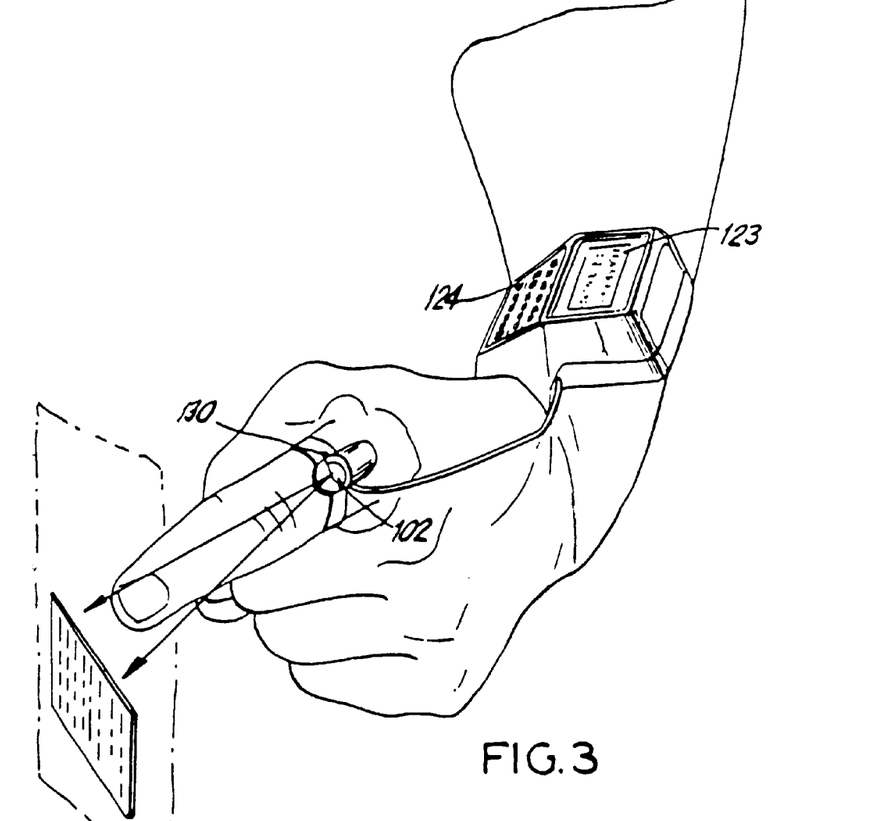
FIG. 3 is a perspective view of a second embodiment of a bar code reader according to the present invention.

In one preferred embodiment, the reader 100 may be a gun shaped device, having a pistol-grip type of handle; a second embodiment is a hand-mounted unit, such as shown in FIG. 2; a third embodiment is a ring-scanner, such as shown in FIG. 3. A movable trigger switch (shown on FIG. 3) on the housing may be employed to allow the user to manually activate the scanner when the user has positioned the device to point at the symbol to be read. Various "triggerless" activation techniques can also be used as will be subsequently described.

The first preferred embodiment may generally be of the style disclosed in U.S. Pat. No. 4,760,248, issued to Swartz et al, or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz et al, or U.S. Pat. No. 4,409,470 issued to Shepard et al, both such patents assigned to Symbol Technologies, Inc., may be employed in constructing the bar code reader unit of FIG. 1. These U.S. Pat. Nos. 4,760,248, 4,896,026 and 4,409,470 are incorporated herein by reference, but the general design of such devices will be briefly described here for reference.

Turning in FIG. 1 in more detail, an outgoing light beam 103 is generated in the reader 100 by a light source 107, usually a laser diode or the like. The light beam from light source 107 is optically modified by an optical assembly 108 to form a beam having certain characteristics. The beam sized and shaped by the assembly 108 is applied to a scanning unit 109. The light beam is deflected to the scanning unit 109 in a specific scanning pattern, i.e. to form a single line, a linear raster scan pattern, or more complex pattern. The scanned beam 103 is then directed by the scanning unit 109 through an exit window 102 to impinge upon a bar code symbol 104 disposed on a target a few inches from the front of the reader. In the embodiments in which the reader 100 is portable, the user aims or positions the portable unit so this scan pattern transverses the symbol 104 to be read. Reflected and/or scattered light 105 from the symbol is detected by a light detector 106 in the reader, producing electrical signals to be processed and decoded for reproducing the data represented by the bar code. As used hereinafter, the term "reflected light" shall mean reflected and/or scattered light.

The characteristics of each of the optical components 107, 108 and 109 may be independently controlled by drive units 110, 111 and 112 respectively. The drive units are operated by digital control signals sent over the control bus 126 by the central processing unit 119, which is preferably implemented by means of a microprocessor contained in the housing 101.

The output of the light detector 106 is applied to an analog amplifier 113 having an adjustable or selectable gain and bandwidth. An amplifier control unit 114 is connected to the analog amplifier 110 to effect the appropriate adjustment of circuit values in the analog amplifier 110 in response to control signals applied to the control unit 112 over the control bus 126.

One output of the analog amplifier 113 is applied to an analog-to-digital (A/D) converter 115 which samples the analog signal to be able to be tested by the CPU 119. The A/D converter is connected to the control bus 126 to transfer the sampled digital signal for processing by the CPU 119.

Another output of the analog amplifier 110 is applied to a digitizer 116. The digitizer 116 converts the analog signal from the analog amplifier 113 into a pulse width modulated digital signal. One type of digitizer is described in U.S. Pat. No. 4,360,798. As previously noted, circuits such as those contained in digitizer 116 have variable threshold levels which, according to the present invention, can be appropriately adjusted. The digitizer control unit 117 is connected to the digitizer 116 and functions to effect the appropriate adjustment of threshold levels in the digitizer 116 in response to control signals applied to the control unit 117 by the CPU 119 over the control bus 126.

The output of the digitizer 116 is applied to an edge detector 118. The operation of the edge detector 118 can be explained with reference to FIG. 4.

Figure 4:
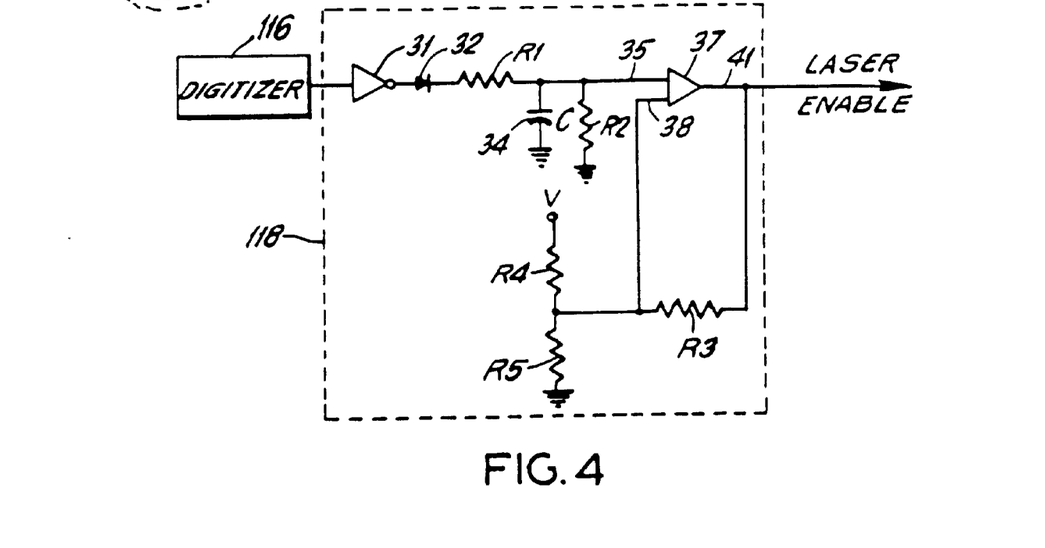
FIG. 4 is a schematic diagram of an electrical circuit used to detected the bar and space patterns of a scan in order to determine whether a valid bar code has been scanned.

In FIG. 4 there is shown a schematic diagram of an embodiment of a preferred edge detector circuit 118 as used in the present invention. This circuit is identical to that disclosed in parent application Ser. No. 506,674, and is included herein for completeness of the discussion. The signal from the digitizer 116 is applied to the input of an invertor 31, the output of which is applied to a diode 32. An RC circuit is formed by first resistor R1 and capacitor (C) 34 with the resistor R1 being connected in series between the output of the diode 32 and a first input 35 of an open collector output comparator 37. The capacitor (C) 34 is connected between the first input 35 and ground potential, and a second resistor R2 is connected between first input 35 and ground potential. The resistance value of resistor R1 is preferably much less than that of resistor R2.

The second input 38 of the comparator is connected to the node of a voltage divider formed by resistor R4 and R5 which are connected in series between potential V and ground. The output 41 of the comparator 37 is connected to the "laser enable" signal line, as well as a feedback through a resistor R3. The feedback from the output of the comparator 37 provides a hysteresis effect to the comparison operation since the other terminal of the resistor R3 is connected to the second input 38 of the comparator 37. The operation of the detector circuit 118 can be described as follows: when the digitizer outputs a bar, the capacitor charges up with a time constant of approximately R1C since R2 is much greater than R1. When the digitizer outputs a space, the capacitor discharges through R2 since the diode 32 prevents the discharging through R1. The time constant R2C is much greater than the time constant R1C so that more space time is required to cancel the effect of a bar.

After several bars and spaces of typical density, a voltage is developed on the capacitor 34 which exceeds the threshold which has been set with the use of the comparator 37. At this time, a "trigger" or a decoder enable signal is output from the comparator 37 to indicate the presence of a bar code. The data from the edge detector 118 can then be passed to the decoder 120 for decoding.

The open collector output of the comparator 37 is driven low at this point which lowers the threshold of the comparator so that minor voltage changes on the capacitor 34 due to the following bars and spaces, and quite zone, will not disable the trigger signal.

The circuit as described would also trigger if a long black bar were to be scanned. However, in the preferred embodiment, the digitizer includes a circuit which discriminates against reading a long black bar, i.e., the digitizer functions as a high pass filter.

As noted above, the edge detector 118 is connected to the decoder 120, which functions in the manner described in the background of the invention. The decoded data is stored in a latch 121 which is connected to a data bus 122. The latch 121 is also connected to the a control bus 126 which is also connected to the CPU 119.

In the preferred embodiment, the adjustment of scanning parameters is implemented in software under control of the CPU 119. The following discussion presents an example of an algorithm that may be implemented in a computer program in the reader according to the present invention.

Figure 5:
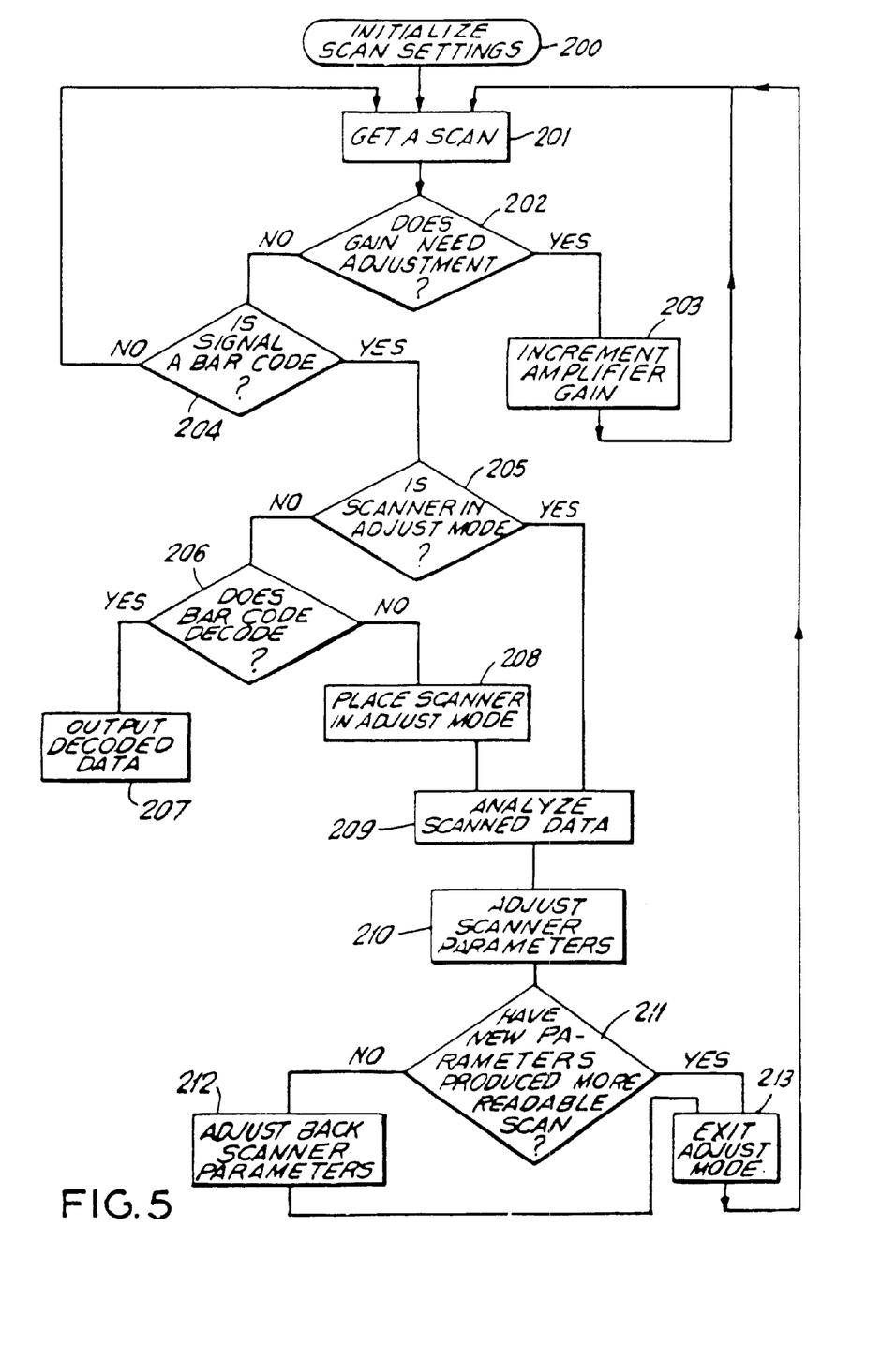
FIG. 5 is a flow chart of an algorithm according to the present invention to determine whether a portion of a bar code has been read, or whether scanner parameters have to be adjusted.

FIG. 5 is a flow chart of an algorithm according to the present invention that functions to determine whether a portion of a bar code has been read, and whether scanner parameters have to be adjusted. It is assumed that certain predetermined initialization parameters are automatically set when the scanner is turned on, as represented by block 200. The scanner is then placed in an "adjust" mode (as opposed to a "read" mode) and the algorithm proceeds.

In the following discussion, reference numerals in parenthesis refer to the functional blocks shown in the flow chart of FIG. 5. A scan is obtained (201) and the resulting signal processed by the analog amplifier 110, the A/D converter 111, and the edge detector 114 is measured and analyzed. Reference may be made to U.S. patent application Ser. No. 635,431 for a type of gain control that is contemplated within the software algorithm according to the present invention. Thus, a determination is made whether the gain of the amplifier 110 needs adjustment (202), and, if so, the gain is incremented (203). Assuming the amplifier gain is appropriate, a determination is made whether the signal is a bar code (204), such as by using the edge detector 114. If the signal is not a bar code or portion of a bar code, the reader does not have a suitable signal to analyze, and data from another scan is obtained (201). If the signal is a bar code, and the reader is in adjust mode (205) the data may be analyzed (209). If the reader is not in adjust mode, and the signal decodes as a proper bar code (206), the data is output (207). If the signal does not decode, the reader is placed in adjust mode (208) and the data analyzed (209).

The method used by the microprocessor CPU 119 to adjust parameters can now be described. Some scanner parameters, such as "motor speed" can be measured and a feedback signal provided to the microprocessor so the microprocessor can tell when proper motor speed has been obtained. A laser power adjustment might need a photosensor either within the scanner or in an external fixture to feed laser power information back to the microprocessor. The monitor photodiode in a laser diode package can be used if it has been calibrated in some way to perform this function.

There are many ways the microprocessor controlled adjustments according to the present invention can be used. During the manufactured process manual adjustments can be eliminated, thereby reducing cost and increasing product consistency and quality. Special fixtures may be used to aid with some adjustments. For example, the scanner can automatically adjust its scanning angle by scanning a predetermined printed bar pattern. It can also adjust its laser power output with the aid of an external laser power meter that feeds information back to the scanner via an electrical interface. The scanner can also adjust its own amplifier gain, bandwidth and digitizer thresholds to the levels that may be determined from an optimization algorithm. This self-adjusting capability simplifies the manufacturing process by enabling scanners with varying capabilities to be easily made on the same assembly line. Thus, the present invention provides a method of manufacturing a bar code reader method of manufacturing a bar code reader, including the steps of: (a) testing a sample bar code reader during the manufacturing process by directing a light beam at a test symbol of the type to be used in a user application; (b) sensing the light reflected from the test symbol at first and second predetermined distances from said reader to produce an output indication of the relative degree of symbol readability sensed at the different distances; (c) automatically determining the optimum optical and electrical characteristics of the reader so to be able to optimally read symbols of the type presented within the working distance range between the first and second distances; and (d) automatically setting the optical and electrical parameters of the reader to correspond to the working distance range defined by the predetermined distances.

Another feature of the present invention is to provide a method of operating a bar code reader, particularly readers being designed for reading a bar code symbol on a target located within a variable working range of distances between the reader and the bar code symbol depending upon the user application, such readers having an adjustment mode and an operating mode, including the steps of: (a) directing a light beam from the reader at a test symbol of the type to be used in a user application at a predetermined distance from the reader with the reader in the adjustment mode; (b) sensing the light reflected from the test symbol at the predetermined distances to produce an output indication of the relative degree of symbol readability at that distances; (c) automatically determining the optimum optical and electrical characteristics of the reader so to be able to optimally read symbols of the type presented within the working distance range; and (d) automatically setting the optical and electrical parameters of the reader to correspond to the working distance range defined by the predetermined distances. After the parameters are set, such as by storing the values in memory, the reader can be placed in operating mode. Thus, for a particular user task (corresponding to the pre-set working range), the readability will be optimized. If the job or task changes, the user shifts back to adjustment mode, reads another test symbol to reset the parameters, and begins again. Still another embodiment or feature of the present invention is to provide an automatic adjustability capability during use to enable the scanner to be self-optimizing. For example, the scanner can be put into a "Learn" mode with a symbol that needs to be scanned in front of it. The scanner can adjust itself until it obtains the highest percentage of successful scans. This is particularly useful in industrial conveyor applications where symbol type and distance to the scanner are fairly consistent. The scanner can also adjust itself to cover a specified range of working distances or symbols with certain readability qualities if presented with symbols at the extremes of the user requirements.

In all of the embodiments described above, once the proper adjustments have been made, the parameter values can be stored in non-volatile memory so the microprocessor can restore them each time the scanner is turned on, or alternatively digital potentiometers with their own non-volatile memory can be used.

The automatic adjustability also allows a scanner to improve its ability to read bar codes as required by the application by an iterative processing of adjustments. For example, if the scanner fails to decode on one scan, it can try a different digitizer threshold on the next scan. The adjustment change can be appropriately made in small increments based on data from the unsuccessful scan, or data from previous symbols.

An alternative version of this invention would use non-volatile digital potentiometers for some or all of the adjustments. These digital pots would not be under the control of the on-board microprocessor, but would only be adjusted under the control of an external fixture.

In order to illustrate how a particular application or operational objective (such as maximum working range) is optimized, we consider as an example the relationship between working range and beam waist size. Although such an objective is more complex than merely improving symbol readability, it does illustrate the mutual dependence of various scanner parameters that must be measured and set at the manufacturing stage of commercial scanners. It also illustrates how a self-adjusting, adaptable bar code scanner according to the present invention may be implemented.

Figure 6:
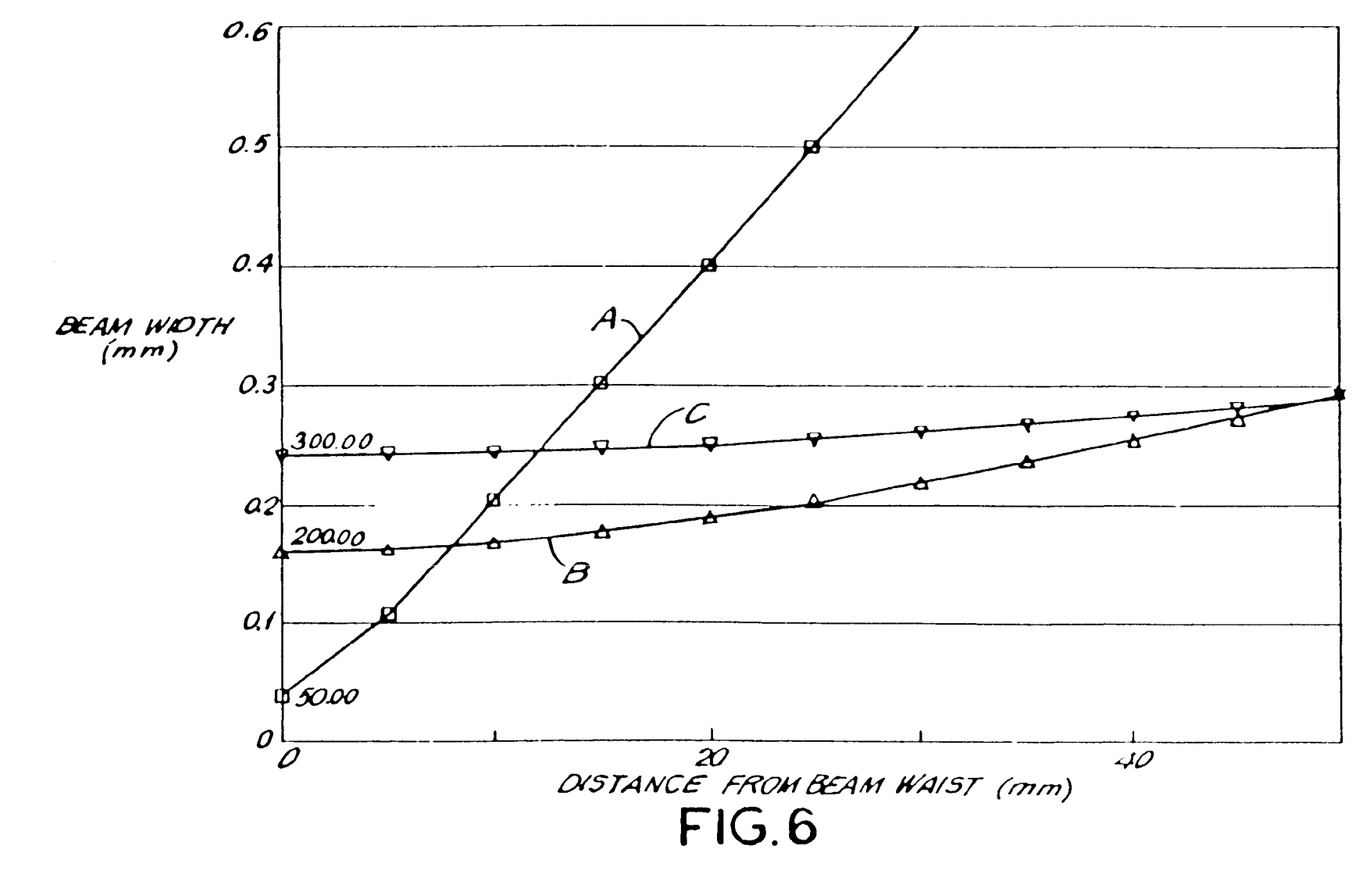
FIG. 6 is a graph that depicts the beam width of a Gaussian beam as a function of distance from the beam waist.

First, we provide some background information on laser beam widths in a bar code scanner. FIG. 6 is a graph that depicts the beam width of a Gaussian beam as a function of distance from the beam waist, for different beam widths. In the Figure the line A represents a laser beam having a beam width of 0.05 mm at the waist; line B represents a laser beam having a beam width of 0.2 mm at the waist; and line C represents a laser beam having a beam width of 0.3 mm at the waist. The contrast in behavior of the beam as the distance from the beam waist increases may best be illustrated by comparing the beams A and B.

Figure 7:
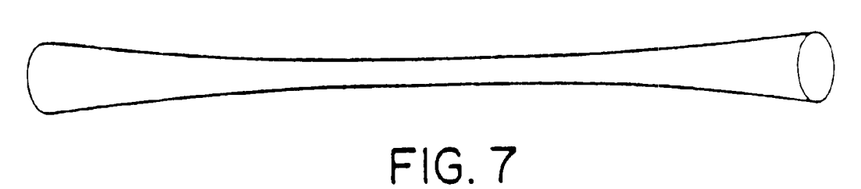
FIG. 7 is a pictorial representation of the beam designated by A in FIG. 6.
Figure 8:
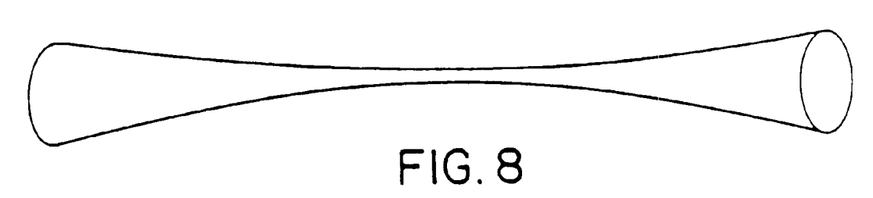
FIG. 8 is a pictorial representation of the beam designated by B in FIG. 6.

FIG. 7 is a pictorial representation of the beam designated by A in FIG. 6 in the region of the waist of the beam, while FIG. 8 is a pictorial representation of the beam designated by B in FIG. 6 in the region of the waist of the beam. The Figures indicate the relatively small amount of beam spreading in the case of FIG. 7, and the significantly greater spreading in the case of FIG. 8.

Assuming that the application objective is to maximize the working range, what optical parameters can be adjusted in order to achieve that objective? In order to answer such question, we begin the analysis as follows:

The Gaussian beam profile in spatial coordinates (normalized to unity power) is given by:

$$1(x) = \frac{1}{\sqrt{2\pi}\sigma} \exp\left(-\frac{x^2}{2\sigma^2}\right) \quad (1)$$

where $$\sigma = \frac{d_{opt}}{4},$$

and $d_{opt}$ is the beam spot size diameter.

In spatial frequency domain $f_x$, the beam transfer function is $$1(f_x) = \exp(-2(\sigma\pi f_x)^2) = \exp\left(-\frac{1}{8}(\pi f_x d_{opt})^2\right) \quad (2)$$

and in the (temporal) frequency domain f, the beam profile is $$1(f) = \exp\left(-2\left(\frac{\sigma\pi f}{V}\right)^2\right) = \exp\left(-\frac{1}{8}\left(\frac{\pi f d_{opt}}{V}\right)^2\right) \quad (3)$$

where V is the scanning velocity and $f=Vf_x$. The maximum spatial frequency $f_{x,max}$ of a bar-code pattern is determined by the minimum bar width $b_{min}$, $$f_{x,max} = \frac{1}{2b_{min}} \quad (4)$$

The intensity transfer function $l(f_x)$ determines the depth of modulation. Thus the contrast at the maximum spatial frequency $f_{x,max}$ corresponds to the minimum contrast. The limit on the minimum contrast $C_{min}$ is set by the requirements of the digitizer. From Eqs. (3) and (4) we obtain $$C_{min} = \exp\left(-\frac{1}{8}\left(\frac{\pi d_{opt}}{2b_{min}}\right)^2\right) \quad (5)$$

This translates into the following requirement on the optical spot size at the edges of the working range:

$$d_{opt} = \frac{4\sqrt{2}}{\pi} b_{min} \sqrt{-\ln(C_{min})} = 1.8\, b_{min}\sqrt{-\ln(C_{min})} \quad (6)$$

Some examples are given in the Table below:

| $C_{min}$ | 0.9 | 0.5 | 0.15 | 0.1 | 0.01 |
|---|---|---|---|---|---|
| $d_{opt}/b_{min}$ | 0.585 | 1.499 | 2.481 | 2.733 | 3.865 |

The waist diameter of the beam is $$d_0 = \frac{d_{opt}}{\sqrt{2}},$$

and the working range is twice the confocal parameter of the beam, i.e.

$$WR = 2\frac{\pi d_0^2}{4\lambda} = \frac{\pi d_{opt}^2}{4\lambda} = \frac{8 b_{min}^2(-\ln(C_{min}))}{\pi\lambda} \quad (7)$$

For example, for $C_{min}=0.15$ and $b_{min}=10$ mil, we obtain from Eq. (6) $d_{opt}=24.8$ mil and from Eq. (7) Wr=465 mm (=18.3").

In this case we can no longer obtain closed-form solutions for the working range, and numerical evaluation is required. It has been shown that the frequency response of the electronic system of the scanner can be approximated by $$H(f) = \exp\left(-\ln(\sqrt{2})\left(\frac{f}{f_c}\right)^2\right) = \exp\left(-0.347\left(\frac{f}{f_c}\right)^2\right) \quad (8)$$

where $f_c$ is the 3 dB bandwidth of the electronic system. The combined response, taking into account both the scanning convolution (Eq. (3)) and system bandwidth [Eq. (8)] is the product of the two:

$$I(f)H(f) = \exp\left(-\frac{1}{8}\left(\frac{\pi f}{V}\right)^2\left(d_{opt}^2 + \frac{4\ln(2)}{\pi^2}\left(\frac{V}{f_c}\right)^2\right)\right) \quad (9)$$

$$= \exp\left(-\frac{1}{8}\left(\frac{\pi f}{V}\right)^2\left(d_{opt}^2 + 0.281\left(\frac{V}{f_c}\right)^2\right)\right)$$

We see that the requirement for $d_{opt}$ [Eq. (6)] is replaced by a requirement for an effective spot size $d_{eff}$, $$d_{eff} = \frac{4\sqrt{2}}{\pi} d_{min}\sqrt{-\ln(C_{min})} = 1.8\, d_{min}\sqrt{-\ln(C_{min})} \quad (10)$$

with $d_{eff}$ given by $$d_{eff}^2 = \left(d_{opt}^2 + 0.281\left(\frac{V}{f_c}\right)^2\right) \quad (11)$$

(It should be noted that at different points along the axis of optical beam the scan velocity is different).

The optimization problem we have posed can then be restated as follows: For a given $d_{eef}$, find the location of the waist of an optical beam that maximizes the working range. The beam is depicted schematically in FIG. 8. The start of the working range is at the point which is located at a distance $x_2$ from the waist of the beam. The distance from the start of the working range to the scan mirror is $d_{ms}$, and the scan speed at $x_2$ is $V_s$.

The beam diameter $d_2$ at $x_2$ is given by $$d_2 = \sqrt{d_{eff}^2 - 0.281\left(\frac{V_s}{f_c}\right)^2} \quad (12)$$

The scan speed at $x_1$ is given by $$V_{max} = V_s\left(1 + \frac{x_1 + x_2}{d_{ms}}\right) \quad (13)$$

and the beam diameter at $x_1$ is $$d_1 = \sqrt{d_{eff}^2 - 0.281\left(\frac{V_{max}}{f_c}\right)^2} \quad (14)$$

and the working range is $$WR = x_1 + x_2 \quad (15)$$

$x_1$ and $x_2$ are related to $d_1$ and $d_2$ as follows $$x_i = \frac{\pi d_0}{4\lambda}\sqrt{d_i^2 - d_0^2}, \quad i = 1, 2 \quad (16)$$

where $d_0$ is the beam waist diameter. After some algebraic manipulation, Eqs. (12) to (16) can be translated into the following expression for WR $$WR = -\frac{B(d_0)}{A(d_0)} \quad (17)$$

where A and B are functions of $d_0$.

$$A(d_0) = \left(\frac{4\lambda}{\pi d_0}\right)^2 + 0.281\left(\frac{V_s}{d_{ms}f_c}\right)^2$$

$$B(d_0) = 2\left(\frac{0.281}{d_{ms}}\left(\frac{V_s}{f_c}\right)^2 - \frac{4\lambda}{\pi d_0}\sqrt{d_2^2 - d_0^2}\right)$$

Thus the optimization problem is reduced to finding $d_0$ that yields the maximum solution for WR in EQ (17).

Figure 9:
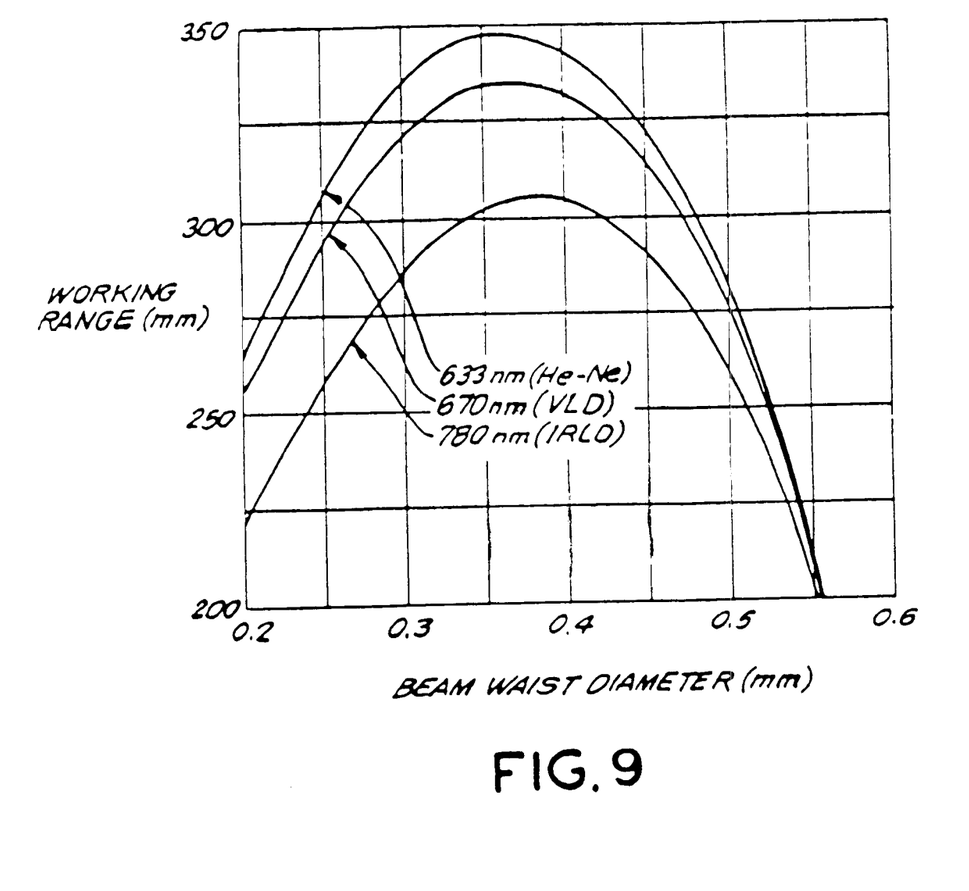
FIG. 9 is a graph that depicts the working range of a scanner of different wavelengths as a function of the beam waist diameter.

As an example, consider the following case. The minimum working range is 1" from the nose of the scanner. The distance from the nose of the scan mirror is 2.5". Thus $d_{ms}$=3.5". The scan velocity at the start of the scanning range is $v_s$=200 inch/sec. and we want to scan bar codes with minimum bar width $b_{min}$=10 mil. The minimum contrast of the digitizer is $C_{min}$=0.15, and the laser wavelength is =0.67. The electronic bandwidth is $f_c$=30 kHZ. Solving Eq. (17) yields the following results: the working range is WR=335.9 mm, the beam waist diameter is 0.37 mm, and the beam diameter at $x_1$ and $x_2$ is 0.46 mm and 0.62 mm, respectively. ($x_2$ and $x_1$ are 217.6 mm and 118.2 mm, respectively). The dependence of WR on $d_0$ for several laser wavelengths is shown in FIG. 9. From Dig 9 we can conclude that shorter wavelengths result in larger working ranges, and that WR is not a very sensitive function of $d_0$.

Although the present invention has been described with respect to reading bar codes, including stacked or two dimensional bar codes such as Code 49 and similar symbologies, it is conceivable that the method of the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component. Control or data lines associated with such components may be connected to an electrical connector mounted on the edge or external surface of the module to enable the module to be electrically connected to a mating connector associated with other elements of data acquisition system.

An individual module may have specific scanning or decoding characteristics associated with it, e.g. operability at a certain working distance, or operability with a specific symbology or printing density. The electrical parameters or other operational characteristics may also be defined through the manual setting of control switches associated with the module, as well as by storing values in memory such as described in the present invention. The user may also adapt the data acquisition system to scan different types of articles, or the system may be adapted for different applications by interchanging modules on the data acquisition system through the use of the simple electrical connector.

The scanning module described above may also be implemented within a self-contained data acquisition system including one or more such components as keyboard, display, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been illustrated and described as embodies in a method of operating an adaptive bar code scanner, it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic of specific aspects of this invention and, therefore, such adaptations should and are intended to be comprehended within the meaning and range of equivalence of the following claims.

What is claimed is:

1. A method of optimally adjusting values for optical and electrical parameters in a laser scanning bar code scanner having an operating mode and an adjustment mode controlled by a microprocessor, comprising the steps of:
   a) directing a scanning laser beam at a bar code symbol;
   b) detecting light reflected from the bar code symbol;
   c) converting the detected light into a first electrical signal;
   d) determining from a magnitude of the first electrical signal whether a gain of an amplifier in the bar code scanner requires adjustment, and changing the gain if adjustment is required;
   e) attempting to decode the first electrical signal;
   f) taking the bar code scanner out of the operating mode and placing the bar code scanner in the adjustment mode if the bar code symbol does not decode;
   g) analyzing the first electrical signal using the microprocessor;
   h) using the microprocessor to incrementally adjust at least one of motor speed, digitizer thresholds, scanning angle, and scanning range based on analysis of the first electrical signal, and generating an adjusted scanning light beam;
   i) directing an adjusted scanning light beam at the bar code symbol;
   j) detecting light reflected from the bar code symbol by the adjusted scanning light beam;
   k) converting the detected light from the adjusted scanning light beam into a second electrical signal;
   l) attempting to decode the second electrical signal based on the adjusted scanning light beam;
   m) continuing incremental adjustments if the second electrical signal does not decode; and
   n) re-entering the operating mode of the bar code scanner after the second electrical signal is decodable.

2. The method of claim 1, further comprising the step of incrementally adjusting at least one of laser power, beam spot size, beam shape, beam width, beam waist, and beam focal point based on analysis of the first electrical signal.

3. The method of claim 2, further comprising the step of storing into a memory parameters obtained through the incremental adjustments.

4. The method of claim 3, further comprising the step of using the microprocessor to retrieve the parameters from the memory and restore the bar code scanner to a condition determined by the parameters each time the bar code scanner is powered on.

5. The method of claim 1, wherein the analyzing step is performed by using an optimization algorithm.

6. The method of claim 1, wherein the steps of d) through h) and l) through n) are all performed under automatic control by the microprocessor.

7. A method of optimally adjusting values for optical and electrical parameters in a bar code scanner having an operating mode and an adjustment mode controlled by a microprocessor, comprising the steps of:
   a) directing a light beam at a bar code symbol;
   b) detecting light reflected from the bar code symbol;
   c) converting the detected light into scanned data comprising electrical signals;
   d) determining whether a gain of an amplifier in the bar code scanner requires adjustment, and changing the gain if adjustment is required;
   e) determining if the scanned data represent a bar code symbology, and determining if the bar code symbol can be decoded;
   f) taking the bar code scanner out of the operating mode and placing the bar code scanner in the adjustment mode if the bar code symbol does not decode;
   g) analyzing the scanned data using the microprocessor;
   h) using the microprocessor to incrementally adjust both optical and electrical parameters of the bar code scanner based on analysis of the scanned data;
   i) continuing incremental adjustments until the bar code symbol is decodable; and
   j) re-entering the operating mode of the bar code scanner and decoding the bar code symbol.

8. The method of claim 7, wherein the optical and electrical parameters include at least one of motor speed, digitizer thresholds, scanning angle, scanning range, laser power, beam spot size, beam shape, beam width, beam waist, and beam focal point.

9. The method of claim 7, further comprising the step of storing into memory the optical and electrical parameters obtained through the incremental adjustments.

10. The method of claim 9, further comprising the step of using the microprocessor to retrieve the optical and electrical parameters from the memory and restore the bar code scanner to a condition determined by the optical and electrical parameters each time the bar code scanner is powered on.

11. The method of claim 7, wherein the analyzing step is performed by using an optimization algorithm.

12. The method of claim 7, wherein the steps d) through j) are all performed under automatic control by the microprocessor.

13. A method of self-optimally adjusting values of both optical and electrical parameters by a bar code scanner operative during use for reading bar code symbols by directing a light beam to and across each symbol in a working range for reflection therefrom, by detecting light reflected from each symbol, and by converting detected light into an electrical signal corresponding to each symbol, the method comprising the steps of:

a) operating a microprocessor during use of the scanner to control processing of the electrical signal into data descriptive of each symbol; and b) self-optimizing the reading of each symbol by having the microprocessor execute an optimization program during use by dynamically determining desired values of the optical and electrical parameters of the scanner for optimal operation of the scanner in the working range, and by automatically adjusting values of both the optical and electrical parameters of the scanner, and by dynamically setting the automatically adjusted values to the determined desired values for optimal reading of each symbol.

14. The method of claim 13, further comprising the step of storing in memory accessible by the microprocessor the determined desired values for operation of the scanner in the working range.

15. The method of claim 13, further comprising the step of determining whether the scanner is set to one of an operating mode and an adjustment mode, and wherein the step of determining desired values of both the optical and electrical parameters is performed if the scanner is determined to be set to the adjustment mode.

16. The method of claim 13, wherein the optical and electrical parameters of the scanner include motor speed, digitizer thresholds, scanning range, laser power, beam spot size, beam shape, beam width, beam waist, beam focal point, detector amplifier gain, and detector amplifier bandwidth.

17. A method of self-adjusting values of both optical and electrical parameters by a scanner operative for reading bar code symbols and having a microprocessor, comprising the steps of:

a) determining under control of the microprocessor, a working range in which the scanner operates to read symbols;

b) receiving from a memory under control of the microprocessor, a set of optimized values of both the optical and electrical parameters of the scanner for operation of the scanner in the working range; and c) automatically having the microprocessor self-execute an optimization program during reading, by adjusting the values of both the optical and electrical parameters, and by dynamically setting the automatically adjusted values to the received, optimized values.

18. The method of claim 17, wherein the optical and electrical parameters of the scanner include motor speed, digitizer thresholds, scanning range, laser power, beam spot size, beam shape, beam width, beam waist, beam focal point, detector amplifier gain, and detector amplifier bandwidth.

19. A method of operating a bar code scanner for reading symbols and having a microprocessor and components having selectable and non-selectable electrical and optical parameters, comprising the steps of:

a) determining under control of the microprocessor, preferred values of both the selectable optical and electrical parameters to achieve a maximum working range, in accordance with the non-selectable parameters; and b) having the microprocessor self-execute an optimization program during reading by dynamically setting a set of values of the selectable optical and electrical parameters to the preferred values.

20. The method of claim 19, wherein the selectable parameters include motor speed, digitizer thresholds, scanning range, laser power, beam spot size, beam shape, beam width, beam waist, beam focal point, detector amplifier gain, and detector amplifier bandwidth.

21. The method of claim 20, wherein a scanning velocity of the beam is 200 inch/sec., a minimum bar width of the symbol is 10 mils, a minimum contrast of a digitizer is 0.15, a wavelength of the beam is 0.67, and an electronic bandwidth is 30 kHz.

22. The method of claim 19, wherein the non-selectable parameters include scanning velocity, minimum bar width of bar code symbols to be scanned, minimum contrast of a digitizer in the scanner, laser wavelength, and electronic bandwidth.

23. The method of claim 19, wherein the step of determining the preferred values of the selectable parameters also includes the step of determining a desired beam waist diameter of a light beam emitted by the scanner.

24. A method of automatically self-adjusting values of both optical and electrical parameters of a bar code scanner operative for reading bar code symbols and having a microprocessor, comprising the steps of:

a) directing a light beam from the scanner at a respective bar code symbol under predetermined conditions;

b) sensing light reflected from the respective symbol;

c) determining under control of the microprocessor, a degree of symbol readability of the scanner within a working range;

d) automatically determining under control of the microprocessor, values of both the optical and electrical parameters of the scanner to optimally read symbols under conditions simulating the predetermined conditions; and e) automatically having the microprocessor self-execute an optimization program during reading, by dynamically setting the values of both the optical and electrical parameters of the scanner to the determined values.

25. The method of claim 24, wherein the parameters include motor speed, digitizer thresholds, scanning range, laser power, beam spot size, beam shape, beam width, beam waist, beam focal point, detector amplifier gain, and detector amplifier bandwidth.

26. A method of self-setting values of both optical and electrical parameters of a bar code scanner operative for reading bar code symbols on a scan-by-scan basis, and having a microprocessor, comprising the steps of:

a) scanning a respective bar code symbol with a light beam;

b) receiving light reflected from the respective symbol;

c) converting the received light into electrical signals; and d) if the electrical signals cannot be decoded by the microprocessor into a valid bar code symbol, performing the steps of:

i) operating the microprocessor to determine desired values of both the optical and electrical parameters of the scanner by processing the electrical signals, ii) incrementally changing the values of both the optical and electrical parameters of the scanner by having the microprocessor self-execute an optimization program during reading, and by dynamically setting the changed values to the determined desired values, and iii) repeating steps a) through d).

27. The method of claim 26, wherein the parameters include motor speed, digitizer thresholds, scanning range, laser power, beam spot size, beam shape, beam width, beam waist, beam focal point, detector amplifier gain, and detector amplifier bandwidth.

* * * * *